United States Patent
Niwa et al.

(10) Patent No.: US 8,023,124 B2
(45) Date of Patent: Sep. 20, 2011

(54) PRINTING APPARATUS AND PRINTING METHOD

(75) Inventors: Takamasa Niwa, Hachioji (JP); Hirotaka Akamatsu, Chofu (JP)

(73) Assignee: Seiko Epson Corporation, Tokyo (JP)

( * ) Notice: Subject to any disclaimer, the term of this patent is extended or adjusted under 35 U.S.C. 154(b) by 837 days.

(21) Appl. No.: 12/080,499

(22) Filed: Apr. 3, 2008

(65) Prior Publication Data

US 2008/0285072 A1 Nov. 20, 2008

(30) Foreign Application Priority Data

Apr. 6, 2007 (JP) .................... 2007-100178

(51) Int. Cl.
*G06F 3/12* (2006.01)
*G06K 15/00* (2006.01)

(52) U.S. Cl. .................... 358/1.13; 358/1.15; 358/1.18; 358/1.16

(58) Field of Classification Search ............ 358/1.13, 358/1.15, 1.18, 1.16, 1.17, 1.9, 1.1, 1.2, 1.5, 358/1.6, 1.14, 400, 401, 404, 444, 407, 468; 715/200, 204, 209, 234, 235, 236, 237, 239, 715/243, 242, 274; 710/14, 8, 62, 65, 66, 710/72; 347/2, 3, 5, 14, 23; 399/1, 8, 9
See application file for complete search history.

(56) References Cited

U.S. PATENT DOCUMENTS

| | | | |
|---|---|---|---|
| 5,278,952 A * | 1/1994 | Kira et al. ................. | 715/209 |
| 2003/0128390 A1* | 7/2003 | Yip et al. .................. | 358/1.18 |
| 2005/0157323 A1* | 7/2005 | Narusawa et al. ........ | 358/1.13 |
| 2005/0216832 A1* | 9/2005 | Giannetti ................... | 715/513 |
| 2006/0092432 A1* | 5/2006 | Ferlitsch ................... | 358/1.1 |
| 2009/0044106 A1* | 2/2009 | Berkner et al. ........... | 715/273 |

FOREIGN PATENT DOCUMENTS

| | | |
|---|---|---|
| JP | 2002-091726 | 3/2002 |
| JP | 2005-135087 | 5/2005 |
| JP | 2006-082270 | 3/2006 |
| JP | 2006-289829 | 10/2006 |
| JP | 2006-338478 | 12/2006 |
| JP | 2009053754 A * | 3/2009 |
| JP | 2010113650 A * | 5/2010 |

OTHER PUBLICATIONS

W3C Working Draft Dec. 21, 2007.

* cited by examiner

*Primary Examiner* — Dov Popovici
(74) *Attorney, Agent, or Firm* — Nutter McClennen & Fish LLP; John J. Penny, V (57) ABSTRACT

A printer includes a print document receiving unit that receives document data, a document analysis unit that generates output document data from the document data, a print mode determination unit that selects a print mode to be executed by the document analysis unit, a layout processing unit that processes the output document data, and a print execution unit that executes printing. The document analysis unit has a serial print mode, a batch print mode, and a partial serial print mode. The print mode determination unit switches the print modes according to a streamable attribute value or a memory usage.

6 Claims, 7 Drawing Sheets

PRINTING APPARATUS AND PRINTING METHOD

The entire disclosure of Japanese Patent Application No. 2007-100178, filed Apr. 6, 2007 is expressly incorporated by reference herein.

BACKGROUND

1. Technical Field

The present invention relates to a document processing of a structured document (XML) in an embedded apparatus, such as a printer or the like.

2. Related Art

As one of markup languages for describing meanings and structures of documents and data, XML (Extensible Markup Language) is known. In addition, there is known SVG (Scalable Vector Graphics) that is an XML-based language for describing 2D vector images and the like. The SVG is released as W3C (World Wide Web Consortium) recommendation. The SVG specifications include the SVG Print specification that defines processing rules in an environment, such as a printer, in which documents described with SVG are printed (Non-Patent Document 1).
[Non-Patent Document 1] SVG Print
(http://www.w3.org/TR/SVGPrint/)

In the SVG Print document, a page element is used to define the range of a page in a print medium output from an apparatus, such a printer or the like. In addition, the content of the document (hereinafter, referred to as document fragment) can be structured so as to be shared with a plurality of pages. Accordingly, for example, a use element can be used to assign such that a document fragment of another page is referred to. During rendering, a document fragment of a reference destination is used as data of a page of a reference source and then processed.

A streamable attribute can be defined in an outermost SVG element in the SVG Print document. The streamable attribute is behind an element assigning a reference to indicate whether or not a document fragment (resource) to be referred to exists.

Specifically, when the streamable attribute value is true, it means that, even if an element assigning a reference exists, no document fragment to be referred exists behind the element. That is, even if an element assigning a reference appears, the reference can be resolved without referring to an element behind the corresponding element. Accordingly, it is not necessary to buffer the entire document in order to resolve the reference.

Meanwhile, when the streamable attribute value is false, it means that, according to an element assigning a reference, a document fragment to be referred to exists behind the corresponding element. That is, when an element assigning a reference appears, the reference may not be resolved. Accordingly, it is necessary to buffer the entire document in order to resolve the reference.

However, among the embedded apparatuses, such as printers and the like, for example, there may be an apparatus that has insufficient memory resources, memory space, or print processing performance. In such an apparatus, when a large volume of an SVG Print document, in which a streamable attribute value is set to false, is printed, buffering of the entire document becomes load, and the memory resources may be depleted or throughput may be markedly deteriorated. In addition, when such an apparatus cannot buffer the entire document, printing of the entire document may not be executed.

An advantage of some aspects of the invention is that it provides a technology capable of, in an apparatus, such as a printer or the like, which prints a SVG Print document, reducing the usage of memory resources of a print processing by switching print modes, improving throughput of the print processing according to the utilization of memory resources or the number of pages of the document, and even if the entire document cannot be buffered, allowing the print processing to be continued.

SUMMARY

According to an aspect of the invention, there is provided a printer that has a function to convert document data into print data and to execute printing. The printer includes: a memory; a print document receiving unit that receives SVG (Scalable Vector Graphics) document data; a document analysis unit that performs syntax/lexical analysis on the received SVG document data to generate output document data and stores the output document data in the memory; a layout processing unit that performs a layout processing to process the output document data on the basis of prescribed style information; a print unit that converts the output document data subjected to the layout processing into print data and executes printing; and a control unit that controls the document analysis unit, the layout processing unit, and the print unit. The control unit has a serial print mode, in which the document analysis unit generates the output document data in a page unit, the layout processing unit performs the layout processing in a page unit, and the print unit executes printing in a page unit, a batch print mode, in which the document analysis unit generates the output document data of all pages, the layout processing unit performs the layout processing of all pages, and the print unit executes printing of all pages, and a partial serial print mode, in which the document analysis unit generates the output document data in a page unit, when the amount of the generated output document data is equal to or more than a predetermined first reference value, the layout processing unit performs the layout processing, and the print unit executes printing. The control unit includes a print mode determination unit that selectively switches the print modes. The print mode determination unit refers to a Streamable attribute value included in the SVG document data, when the attribute value is true, selects the serial print mode, when the attribute value is false, selects the batch print mode, and when the batch print mode is selected and the amount of the generated output document data is equal to or more than a predetermined second reference value, selects the partial serial mode.

1: PRINTER, 11: CPU, 12: RAM, 13: ROM, 14: PRINTER ENGINE, 15: INPUT DEVICE, 16: DISPLAY DEVICE, 17: COMMUNICATION DEVICE, 18: READ/WRITE DEVICE, 100: PRINT DOCUMENT RECEIVING UNIT, 110: PRINT CONTROL UNIT, 120: DOCUMENT ANALYSIS UNIT, 125: SERIAL PRINT MODE, 126: BATCH PRINT MODE, 127: PARTIAL SERIAL PRINT MODE, 140: PRINT MODE DETERMINATION UNIT, 170: LAYOUT PROCESSING UNIT, 180: PRINT EXECUTION UNIT

DESCRIPTION OF EXEMPLARY EMBODIMENTS

Hereinafter, exemplary embodiments of the invention will be described with reference to the drawings.

Figure 1:
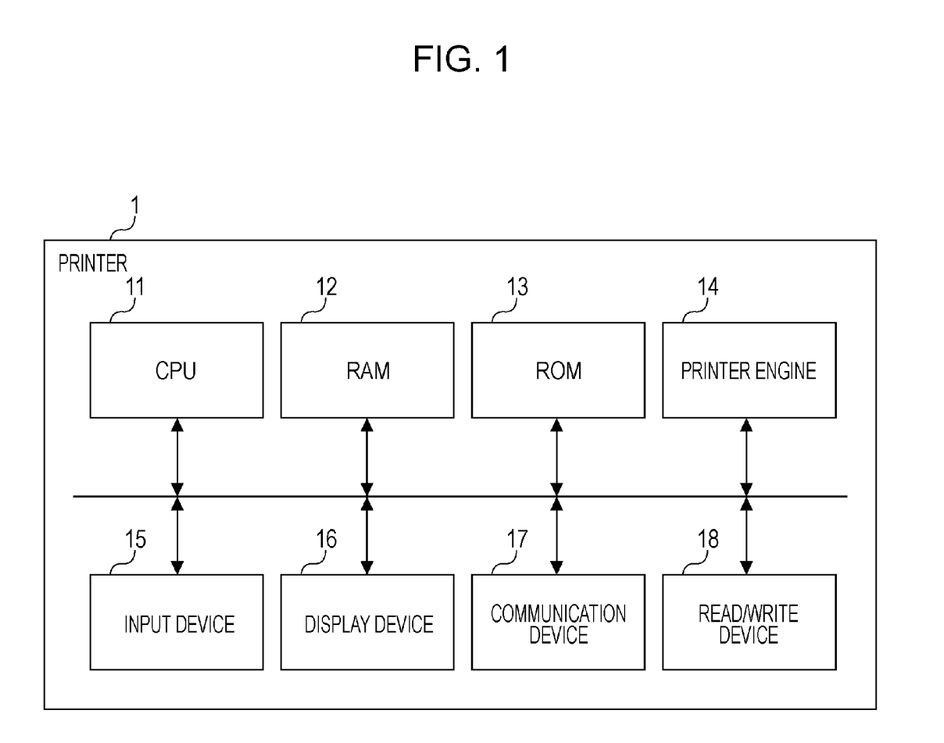
FIG. 1 is a block diagram illustrating the outline of the hardware configuration of a printer according to an embodiment of the invention.

FIG. 1 is a block diagram illustrating the outline of the hardware configuration of a printer, to which a first embodiment of the invention is applied. In this embodiment, a printer receives SVG Print document data, converts the document data into print data, and executes printing.

As shown in FIG. 1, the printer 1 includes a CPU 11 that executes various programs, a RAM 12 that temporarily stores data, programs, and the like, a ROM 13 that preliminarily stores various kinds of data, programs, and the like for controlling the printer 1 in nonvolatile manner, a printer engine 14 that includes a print head, a carriage driving mechanism for driving a carriage, on which the print head is installed, a paper feed mechanism, and the like, an input device 15 that receives an operation from a user, a display device 16 that displays a printer status or a user interface screen, such as a menu screen or the like, a communication device 17 that performs data communication with a computer, and a read/write device 18 that reads and writes information with respect to a portable recording medium (not shown), such as a USB memory or the like. The communication device 17 performs communication according to the standard of Ethernet (Registered Trademark), wireless LAN, or Bluetooth, for example. However, the configuration of the printer 1 is not limited thereto.

Figure 2:
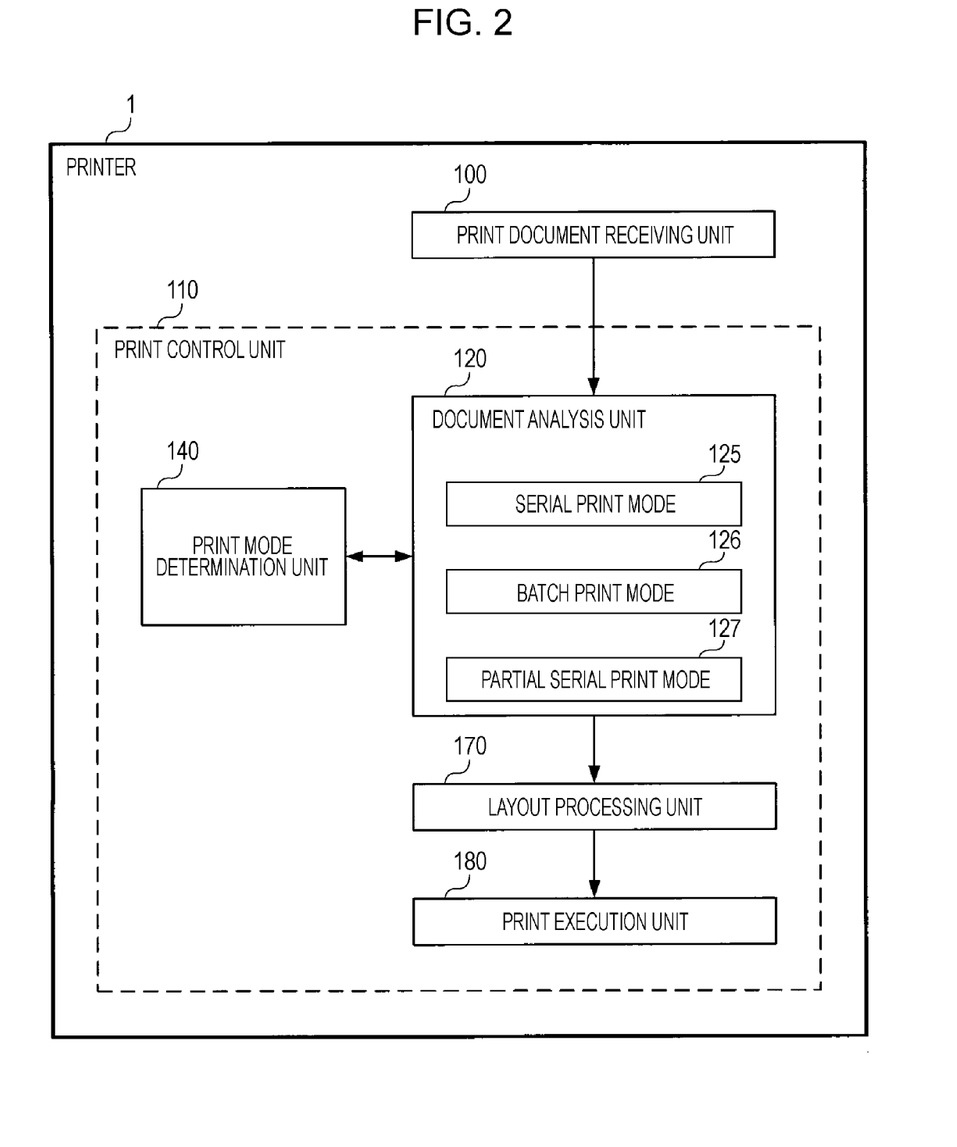
FIG. 2 is a block diagram illustrating the functional configuration of a printer according to an embodiment of the invention.

Next, the functional configuration that is embodied in the printer 1 having the above-described configuration will be described with reference to FIG. 2. FIG. 2 is a block diagram illustrating the functional configuration of the printer 1.

As shown in FIG. 2, on the printer 1, a print document receiving unit 100 and a print control unit 110 are constructed. Of course, if necessary, other functional configurations, such as an operating system and the like, may be provided.

The print document receiving unit 100 and the print control unit 110 are constructed, for example, by loading the program preliminarily stored in the ROM 13 shown in FIG. 1 onto the RAM 12 and running the program on the CPU 11. The program may be read from the portable recording medium by means of the read/write device 18 or may be downloaded from a network by means of the communication device 17 to the ROM 13, may be loaded onto the RAM 12, and may run on the CPU 11. In addition, the program may be loaded onto the RAM 12 from the portable recording medium by means of the read/write device 18 or from the network by means of the communication device 17, and may run on the CPU 11.

The print document receiving unit 100 receives SVG Print document data to be printed from a computer or the like (not shown) through the communication device 17. In addition, the print document receiving unit 100 transfers the received SVG Print document data to the print control unit 110. Of course, the print document receiving unit 100 is not limited to the above-described configuration. For example, the print document receiving unit 100 may receive SVG Print document data from the portable recording medium by means of the read/write device 18.

The print control unit 110 performs syntax/lexical analysis on the input SVG Print document data to convert the SVG Print document data into print data, and executes a print processing. In addition, the print control unit 110 selects a print mode, for example, according to the utilization of the RAM 12, and executes the print processing in the selected print mode. To this end, the print control unit 110 includes a document analysis unit 120, a print mode determination unit 140, a layout processing unit 170, and a print execution unit 180.

The document analysis unit 120 performs a processing to execute syntax/lexical analysis on the received SVG Print document data, and to store the analysis result in the RAM 12 as output document data. This processing is performed for each page (page element) constituting the SVG Print document data. Specifically, the document analysis unit 120 checks the grammar of the SVG Print document data by using an XML server or the like, and expands the SVG Print document data onto the RAM 12 according to DOM (Document Object Model) as a document tree. The document tree means a data structure for hierarchically managing the elements of the XML document as objects. Here, a tree structure for subelements of the page element is referred to as a subtree.

The document analysis unit 120 instructs the layout processing unit 170 to perform a layout processing on the generated output document data.

When the instruction to perform the layout processing is received, the layout processing unit 170 performs the layout processing to process output document data to be processed, which is assigned in the instruction and stored in the RAM 12, on the basis of style information assigned in the document data. In addition, the layout processing unit 170 also performs the layout processing according to the size of a page medium or the like. The style information is, for example, CSS (Cascading Style Sheet) or the like, and is received together with the SVG Print document data.

The print execution unit 180 converts the output document data after the layout processing into image data by rendering, outputs the image data as print data, and instructs the printer engine 14 to execute printing on a paper or the like serving as a recording medium.

In this embodiment, the document analysis unit 120 includes a plurality of print modes. The document analysis unit 120 performs a processing in one of the print modes. The print modes include a serial print mode 125, a batch print mode 126, and a partial serial print mode 127. The print modes are control methods for the print processing that vary by timings (units) at which the layout processing unit is instructed to perform the layout processing on the generated output document data. Hereinafter, the print modes will be described in detail.

During the serial print mode 125, if output document data for a page (page element) is generated and stored in the RAM 12, the document analysis unit 120 outputs, to the layout processing unit 170, an instruction to perform a layout processing on the output document data for that page. Then, if the layout processing unit 170 and the print execution unit 180 complete the layout processing and the print processing on the page, respectively, the output document data in the RAM 12 is deleted, and a next page is processed. In this way, the document analysis unit 120 repeatedly performs the processing in a page unit, and performs a print processing of all pages constituting the SVG Print document data.

During the batch print mode 126, the document analysis unit 120 generates output document data for each of the pages constituting the received SVG Print document data, and stores the output document data in the RAM 12. Then, if all of the pages are processed, the document analysis unit 120 outputs, to the layout processing unit 170, an instruction to perform a layout processing on the output document data for all of the pages stored in the RAM 12. If the layout processing unit 170 and the print execution unit 180 complete the layout processing and the print processing on all of the pages, respectively, the output document data in the RAM 12 is deleted, and the print processing ends.

During the partial serial print mode 127, the document analysis unit 120 generates output document data for each of the pages constituting the received SVG Print document data, and stores the output document data in the RAM 12. Then, when the amount of the output document data exceeds a prescribed reference value, such as a memory usage in the RAM 12 or the number of pages, the data analysis unit 120 outputs, to the layout processing unit 170, an instruction to perform a layout processing on the output document data stored in the RAM 12. If the layout processing unit 170 and the print execution unit 180 complete the layout processing and the print processing on the output document data, respectively, the output document data in the RAM 12 is deleted, and a processing is performed from a page, for which output document data is not generated. In this way, the document analysis unit 120 repeatedly performs the processing, for example, in several pages, and performs the print processing on all of the pages constituting the SVG Print document data.

A print method to be executed by the document analysis unit 120 is selected or switched by the print mode determination unit 140.

First, the print mode determination unit 140 refers to a streamable attribute value which is described in the SVG Print document data received by the document analysis unit 120. Then, a print mode (initial mode) is determined according to the value (true or false). Specifically, when the attribute value is true (it is not necessary to buffer the entire document), the print mode determination unit 140 selects the serial print mode 125. Meanwhile, when the attribute value is false (it is necessary to buffer the entire document), the print mode determination unit 140 selects the batch print mode 126. If the print mode is selected, the document analysis unit 120 starts a print processing on the SVG Print document data to be printed.

While the document analysis unit 120 performs a processing in the batch print mode 126, for example, if it is detected that an available memory resource in the RAM 12 becomes less than a predetermined reference value, the print mode determination unit 140 switches the print mode to the partial serial print mode 127. The switching condition may be, for example, the number of pages or the upper limit of the memory space in the RAM 12, which is usable in the document analysis unit 120.

Next, the operation of the printer 1 will be described in detail with reference to FIG. 3 to FIG. 5 with particular emphasis on the operation of the print control unit 110.

Figure 3:
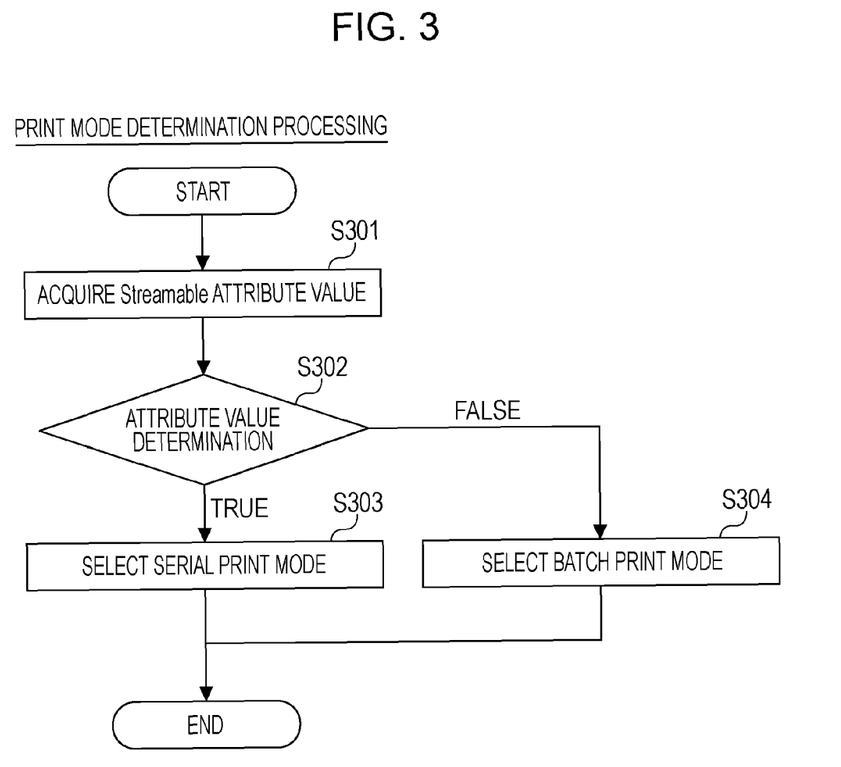
FIG. 3 is a flowchart illustrating the flow of a print mode determination processing.

FIG. 3 is a flowchart illustrating the flow of a print mode (initial mode) determination processing. When the SVG Print document data output from the print document receiving unit 100 is received, the document analysis unit 120 instructs the print mode determination unit 140 to perform a print mode determination processing shown in FIG. 3.

First, the print mode determination unit 140 acquires the Streamable attribute value in the SVG Print document data (Step S301).

Then, the print mode determination unit 140 refers to the attribute value, and determines whether the attribute value is true or false (Step S302).

If the attribute value is true (at Step S302, true), the print mode determination unit 140 selects, as a print mode, the serial print mode 125 (Step S303).

Meanwhile, if the attribute value is false (at Step S302, false), the print mode determination unit 140 selects the batch print mode 126 (Step S304).

In this way, if the print mode is selected, the print mode determination unit 140 ends the print mode determination processing.

Figure 4:
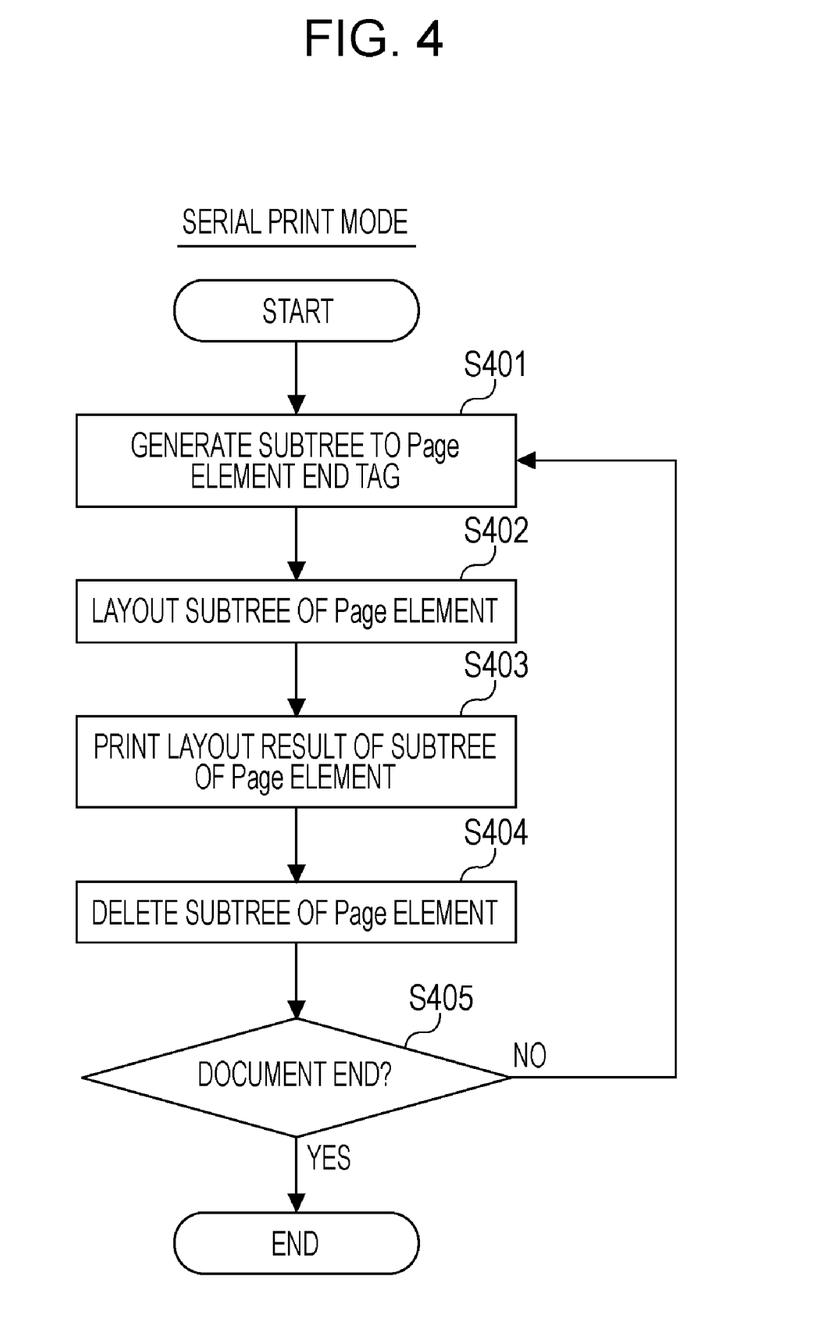
FIG. 4 is a flowchart illustrating the flow of a print processing in a serial print mode.

FIG. 4 is a flowchart illustrating the flow of a print processing in a serial print mode. In the above-described print mode determination processing (FIG. 3), if the serial print mode 125 is selected, the document analysis unit 120 starts a print processing shown in FIG. 4 in the serial print mode 125.

First, the document analysis unit 120 generates a subtree (output document data) to a page element end tag of a first page, and stores the subtree in the RAM 12 (Step S401). In addition, the document analysis unit 120 outputs, to the layout processing unit 170, an instruction to perform a layout processing on the subtree for that page.

If the instruction is received, the layout processing unit 170 performs the layout processing on the subtree for the first page in the RAM 12 on the basis of pre-assigned style information (Step S402).

If the layout processing ends, the print execution unit 180 performs rendering on the subtree for the first page after the layout processing, and print the data by using the printer engine 14 (Step S403).

If the print processing for the first page ends, the document analysis unit 120 deletes the subtree for that page stored in the RAM 12 (Step S404).

Then, the document analysis unit 120 determines whether or not the page (page element) subjected to the print processing is the last page in the SVG Print document data (Step S405).

If it is determined that the page is not the last page (at Step S405, No), the print processing is performed on the page element of a next page (Steps S401 to S404). Subsequently, the print processing is similarly performed until the page is the last page (at Step S405, Yes).

Then, if it is determined that the page is the last page (at Step S405, Yes), the print processing of the SVG Print document data ends.

Figure 5:
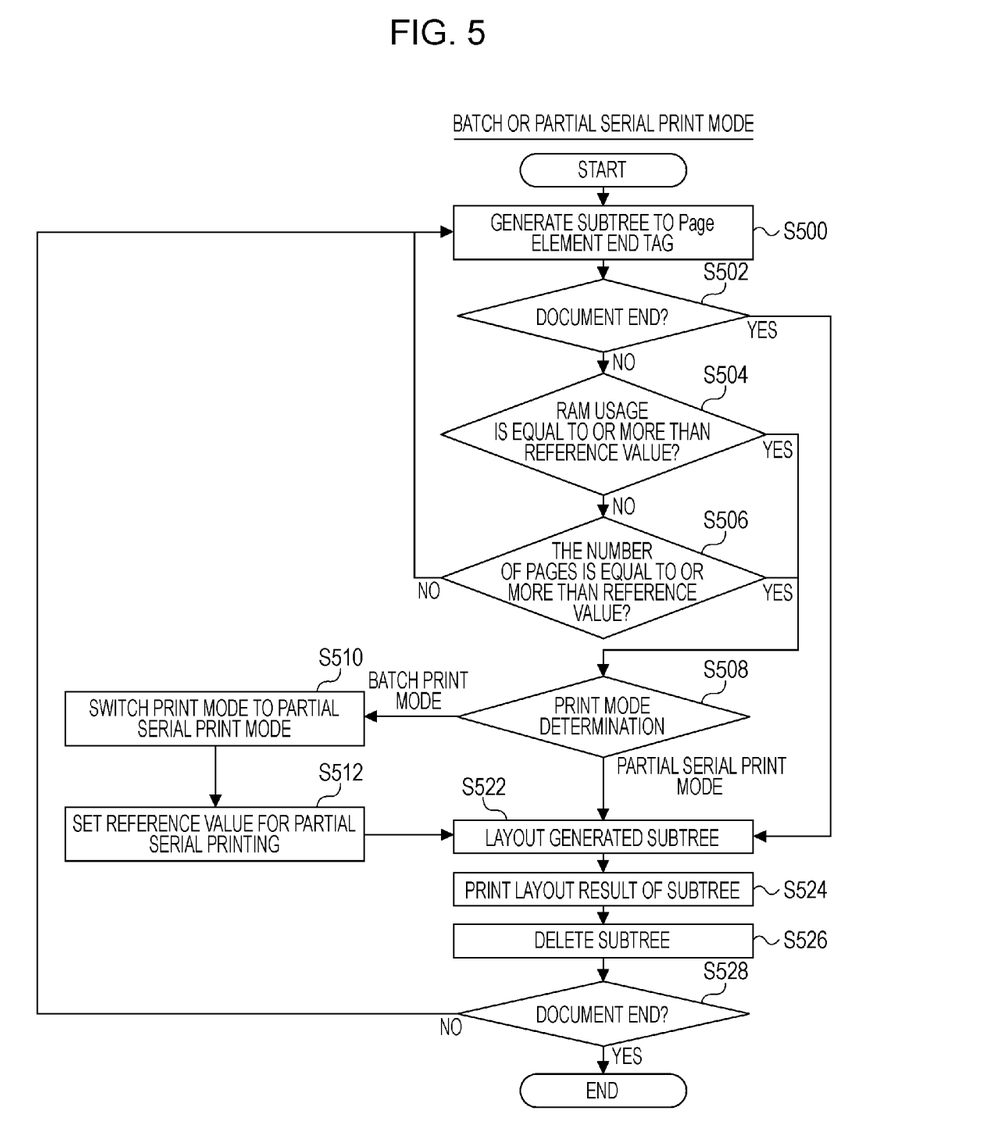
FIG. 5 is a flowchart illustrating the flow of a print processing in a batch print mode or a partial serial print mode according to a first embodiment of the invention.

FIG. 5 is a flowchart illustrating the flow of a print processing in a batch print mode or a partial serial print mode. In the above-described print mode determination processing (FIG. 3), if the batch print mode 126 is selected, the document analysis unit 120 starts a print processing shown in FIG. 5.

First, the document analysis unit 120 generates a subtree (output document data) to a page element end tag of a first page, and stores the subtree in the RAM 12 (Step S500).

Then, the document analysis unit 120 determines whether or not the generated subtree is the last page in the SVG Print document data (Step S502).

If it is determined that the subtree is the last page (at Step S502, Yes), the layout processing unit 170 performs a layout processing described below (Step S522). Meanwhile, if it is determined that the subtree is the last page (at Step S502, No), the print mode determination unit 140 performs a next determination processing (Steps S504 and S506).

That is, the print mode determination unit 140 determines whether or not the data amount of the subtree stored in the RAM 12 is equal to or more than a prescribed reference value (Step S504).

As the reference value of the data amount, when a current print mode is the batch print mode 126 (initial mode), for example, the maximum value of a memory space in the RAM 12 that can be allocated to the document analysis unit 120 is set in advance.

Meanwhile, when the print mode is switched over to the partial serial print mode 127 by a switching processing described below (at Step S508, batch print mode, and Steps S510 and S512), as the reference value of the data amount, a value which is smaller than the reference value in the above-described batch print mode 126 is set.

The reference value of the data amount for the partial serial print mode 127 is a value that is determined in advance, for example, in consideration of the memory space of the entire RAM 12, a balance with a memory space to be used by other programs or the like, the throughput of the print processing, and the like. This is done because the memory usage is reduced, and the throughput of the print processing is improved, as compared with the batch print mode.

Of course, the determination condition is not limited to the above-described condition. For example, a memory space (available space) in the RAM 12, which is usable by a program or the like, may be used as the reference value. In this case, if the available space is less than a prescribed value, the document analysis unit 120 stops to generate a subtree.

If it is determined that the data amount of the subtree is less than the reference value (at Step S504, No), the print mode determination unit 140 determines whether or not the number of pages of the output document data stored in the RAM 12 is equal to or more than a prescribed reference value (Step S506).

The reference value of the number of pages is set in advance, for example, in consideration of a balance between an available memory space in a lump and the throughput of the print processing because, during the batch print mode 126, as the number of pages to be printed in a lump becomes large, the throughput of the print processing is deteriorated.

When the print mode is switched over to the partial serial print mode 127 by a switching processing described below (at Step S508, batch print mode, and Steps S510 and S512), as the reference value of the number of pages, a value which is smaller than the reference value in the batch print mode 126 is set. This is done because the memory usage is reduced and the throughput of the print processing is improved, as compared with the batch print mode.

Moreover, the determination processing (Step S506) is not necessarily used, but the determination processing (Step S504) based on the usage of the RAM 12 may only be used.

If it is determined that the number of pages of the output document data is less than the reference value (at Step S506, No), the document analysis unit 120 returns to Step S500 and continues the processing. That is, the document analysis unit 120 generates a subtree to a page element end tag of a next page, and stores the subtree in the RAM 12 as output document data. Subsequently, excluding when a subtree is generated to the end of the document (at Step S502, Yes) or when the generated subtree is equal to or more than a predetermined reference value (at Step S504 or S506, Yes), a subtree for each page is generated and stored in the RAM 12 as output document data.

Meanwhile, if it is determined that the data amount of the subtree or the number of pages is equal to or more than the reference value (at Step S504 or S506, Yes), the print mode determination unit 140 determines which print mode is currently selected (Step S508).

When the current print mode is the batch print mode (at Step S508, batch print mode), the print mode determination unit 140 switches over the print mode to the partial serial print mode (Step S510).

The print mode determination unit 140 sets the reference values of the data amount and the number of pages to be used in the above-described determination processing (Steps S504 and S506) to the values for the partial serial print mode (Step S512), and then the process progresses to Step S522.

If switching is made, then, the print processing shown in FIG. 5 is performed in the partial serial print mode 127. That is, the print mode determination unit 140 performs determination according to the reference values for the partial serial print mode in the determination processing (Steps S504 and S506) based on the data amount of the subtree and the number of pages.

Meanwhile, if the above-described switching processing is performed (at Step S508, batch print mode, and Steps S510 and S512), and the current print mode becomes the partial serial print mode (at Step S508, partial serial print mode), the process progresses to Step S522.

If the document analysis unit 120 generates a subtree to the end of the document (last page) (at Step S502, Yes), and the print mode determination unit 140 switches over the print mode (Steps S510 and S512) or the print mode determination unit 140 determines that the print mode is the partial serial print mode (at Step S508, partial serial print mode), at Step S522, the document analysis unit 120 outputs, to the layout processing unit 170, the instruction to perform the layout processing on the generated subtree.

If the instruction is received, the layout processing unit 170 performs the layout processing on all of the subtrees in the RAM 12 on the basis of assigned style information (Step S522).

If the layout processing ends, the print execution unit 180 performs rendering on all of the subtrees after the layout processing in the RAM 12 to generate print data, and performs a print processing by means of the printer engine 14 (Step S524).

If the print processing ends, the document analysis unit 120 deletes all of the subtrees stored in the RAM 12 (Step S526).

Next, the document analysis unit 120 determines whether or not the print processing is performed to the last page (page element) (Step S528).

If it is determined that the subtree is generated to the end of the document (at Step S528, Yes), the document analysis unit 120 ends the print processing.

Meanwhile, if it is determined that the subtree is not generated to the end of the document (at Step S528, No), the document analysis unit 120 returns to Step S500 and continues the processing. That is, the document analysis unit 120 generates subtrees of a page, for which a subtree is not generated, and later, and stores the subtrees in the RAM 12 as output document data. Subsequently, the document analysis unit 120 performs the above-described processing until the print processing ends to the end of the document (at Step S528, Yes). Moreover, after the print mode is switched (Steps S510 and S512), when initial printing is executed, the subtree is not generated to the last page (at Step S528, No), and the process returns to Step S500.

In this way, the document analysis unit 120 ends the print processing of the SVG Print document data in the batch print mode or the partial serial print mode.

The first embodiment has been hitherto described. Accordingly, in an apparatus, such as a printer or the like, which prints a SVG Print document, when a streamable attribute value of a document to be printed is set to false, a print mode is switched according to the utilization of the memory resource or the number of pages. Therefore, the usage of the memory in the print processing can be reduced, and the throughput of the print processing can be improved. In addition, even if the subtrees of the entire SVG Print document cannot be buffered in the memory, the print processing can be continued.

Next, a second embodiment of the invention will be described. In the first embodiment, during the partial serial print mode 127, the document analysis unit 120 performs the print processing, regardless of whether or not the generated subtree can resolve a reference. For this reason, the document may be printed while part of the document fragments is missing. In contrast, the second embodiment is configured to execute printing after reference information is resolved, if possible. A difference from the first embodiment is a print processing during a partial serial print mode. Hereinafter, a description will be given with reference to FIG. 6.

Figure 6:
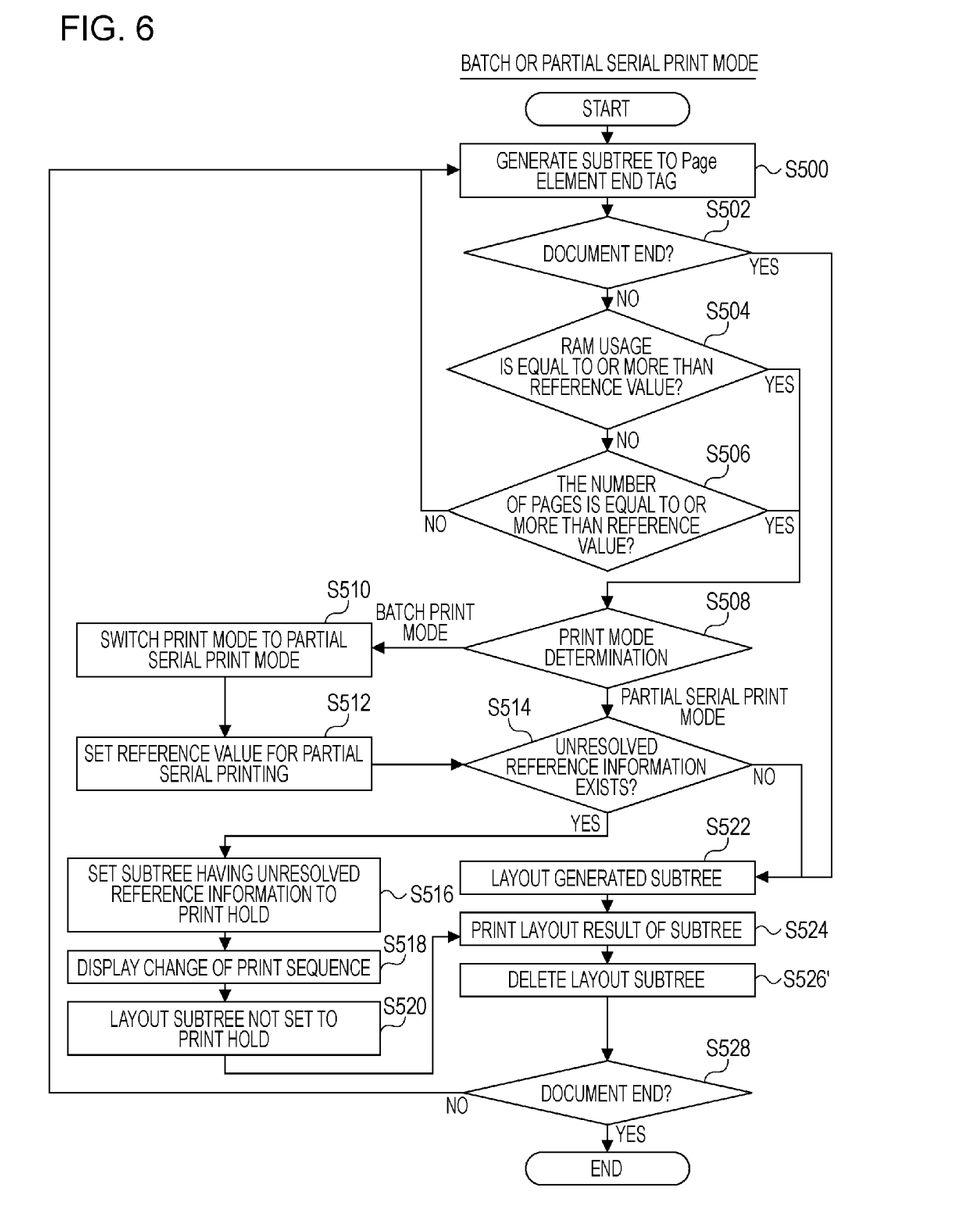
FIG. 6 is a flowchart illustrating the flow of a print processing in a batch print mode or a partial serial print mode according to a second embodiment of the invention.

FIG. 6 is a flowchart illustrating the flow of a print processing in a batch print mode or a partial serial print mode according to the second embodiment of the invention. In the above-described print mode determination processing (FIG. 3), if the batch print mode 126 is selected, the document analysis unit 120 starts a print processing shown in FIG. 6.

The process from Step S500 to Step 512 is the same as that in the first embodiment, and the description thereof will be omitted.

When the print mode determination unit 140 switches the print mode (Steps S510 and S512) or when the print mode determination unit 140 determines the partial serial print mode as the print mode (at Step S508, partial serial print mode), the document analysis unit 120 first checks whether or not an element having an unresolved reference exists in the subtree generated on the RAM 12 (Step S514).

When no unresolved reference information exists or when all references for a subtree set to print hold (Step S516) can be resolved (at Step S514, No), at Step S522, the document analysis unit 120 outputs, to the layout processing unit 170, an instruction to perform a layout processing on all of the subtrees generated on the RAM 12.

If the instruction is received, the layout processing unit 170 performs the layout processing on all of the subtrees generated on the RAM 12 on the basis of pre-assigned style information (Step S522).

Meanwhile, when any unresolved reference information exists (at Step S514, Yes), the document analysis unit 120 sets a print hold for a subtree (page) in which an element assigning the corresponding reference is included (Step S516). The page set to the print hold is held on the RAM 12 until the reference is resolved.

Figure 7:
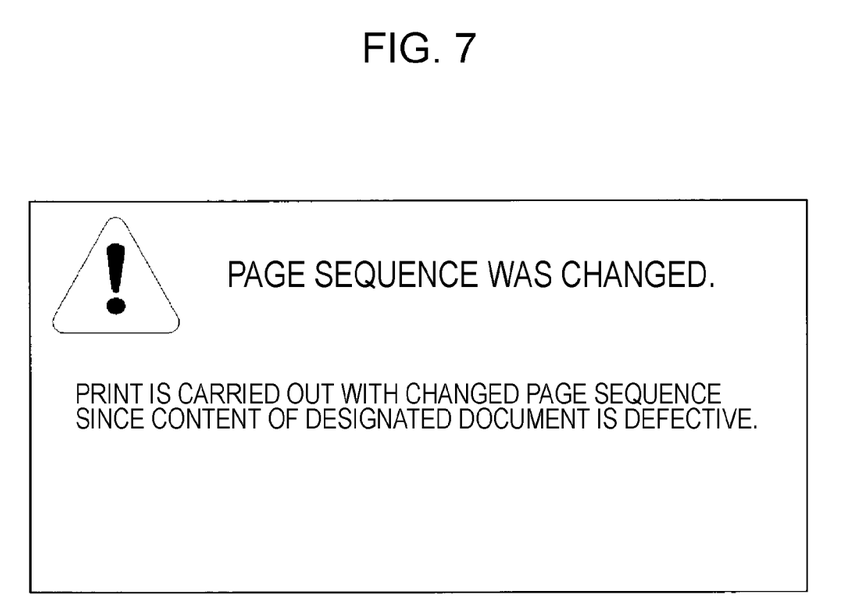
FIG. 7 is a diagram illustrating a display example indicating that a print sequence was changed.

In addition, since the page set to the print hold is printed after a page having a resolved reference, the document analysis unit 120 controls the display device 16 (FIG. 1) to display that a print sequence was changed (Step S518). For example, a user can be informed through a screen shown in FIG. 7 that the print sequence was changed.

Then, as Step S520, the document analysis unit 120 outputs, to the layout processing unit 170, an instruction to perform a layout processing on a subtree not set to a print hold among the subtrees generated on the RAM 12.

If the instruction is received, the layout processing unit 170 performs the layout processing on the subtree not set to the print hold on the RAM 12 on the basis of the pre-assigned style information (Step S520).

If the layout processing is completed (Step S520 or S522), the print execution unit 180 performs rendering on the subtree after the layout processing on the RAM 12 to generate print data, and performs a print processing based on the data by means of the printer engine 14 (Step S524). Moreover, since the subtree not set to the print hold does not undergo the layout processing (Step S520), the print execution unit 180 does not perform a print processing for that subtree.

If the print processing is completed, the document analysis unit 120 deletes subtrees, which have undergone the layout processing and the print processing, among the subtrees stored in the RAM 12 (Step S526').

Then, the document analysis unit 120 determines whether or not the print processing is performed to the last page (page element) (Step S528).

If it is determined that the subtree is generated to the end of the document (at Step S528, Yes), the document analysis unit 120 ends the print processing.

Meanwhile, if it is determined that the subtree is not generated to the end of the document (at Step S528, No), the document analysis unit 120 returns to Step S500 and continues the processing. That is, the document analysis unit 120 generates subtrees of a page for which a subtree is not generated, and later, and stores the subtrees in the RAM 12 as output document data. In addition, when reference information appears for a subtree sent to the print hold, the document analysis unit 120 resolves the reference and resets the print hold. Then, the above-described processing is performed until the print processing is completed to the end of the document (at Step S528, Yes).

In this way, the document analysis unit 120 ends the print processing of the SVG Print document data. Moreover, when the print sequence was changed, the number of pages when the print sequence is not changed (the number of pages of a sequence in which the subtrees are generated) may be printed on each page.

The second embodiment has been hitherto described. Accordingly, in an apparatus, such as a printer or the like, which prints a SVG Print document, when a streamable attribute value of a document to be printed is set to false, a print mode is switched according to the utilization of the memory resource or the number of pages of the document. Therefore, the usage of the memory resource in the print processing can be reduced, and the throughput of the print processing can be improved. In addition, even if the subtrees of the entire SVG Print document cannot be buffered in the memory, the print processing can be continued.

Furthermore, a possibility that the document is printed while part of document fragments is missing can be reduced as small as possible. In addition, a user can be informed through a screen that the print sequence was changed.

As the modifications of the first embodiment and the second embodiment, the following configuration may be made.

For example, in the determination processing (Step S504 in FIG. 5 or 6), the print mode determination unit 140 may perform the determination processing with a memory space to be used by the layout processing unit 170 as a reference value. Specifically, as the reference value, the maximum value of a memory space on the RAM 12 that can be allocated to the layout processing unit 170 is set in advance. Accordingly, the switching condition from the batch print processing mode to the partial serial print processing mode can be controlled in detail.

Further, the document analysis unit 120 may perform the print processing in the serial print mode regardless of the Streamable attribute value. Accordingly, at a point of time at which an unresolvable reference appears, the print mode determination unit 140 may switch over the print mode to the partial serial print mode or the batch print mode.

While the invention has been described in connection with the illustrative embodiments, it is evident that various alternatives, modifications, and variations will be apparent to those skilled in the art. Therefore, the embodiments of the invention are construed to be illustrative and not in any way limiting of the spirit and scope of the invention.

What is claimed is:

1. A printer that has a function to convert document data into print data and to execute printing, the printer includes:
a memory;
a print document receiving unit that receives SVG (Scalable Vector Graphics) document data;
a document analysis unit that performs syntax/lexical analysis on the received SVG document data to generate output document data and stores the output document data in the memory;
a layout processing unit that performs a layout processing to process the output document data on the basis of prescribed style information;
a print unit that converts the output document data subjected to the layout processing into print data and executes printing; and
a control unit that controls the document analysis unit, the layout processing unit, and the print unit,
wherein the control unit has
a serial print mode, in which the document analysis unit generates the output document data in a page unit, the layout processing unit performs the layout processing in a page unit, and the print unit executes printing in a page unit,
a batch print mode, in which the document analysis unit generates the output document data of all pages, the layout processing unit performs the layout processing of all pages, and the print unit executes printing of all pages, and
a partial serial print mode, in which the document analysis unit generates the output document data in a page unit, when the amount of the generated output document data is equal to or more than a predetermined first reference value, the layout processing unit performs the layout processing, and the print unit executes printing,
the control unit includes a print mode determination unit that selectively switches print modes, and
the print mode determination unit refers to a streamable attribute value included in the SVG document data, when the attribute value is true, selects the serial print mode, when the attribute value is false, selects the batch print mode, and when the batch print mode is selected and the amount of the generated output document data is equal to or more than a predetermined second reference value, selects the partial serial print mode.

2. The printer according to claim 1,
wherein the first reference value is a prescribed space of an area on the memory, which is usable during the partial serial print mode, or a prescribed number of pages,
the second reference value is a prescribed space of an area on the memory, which is usable during the batch print mode, or the prescribed number of pages, and
the first reference value is smaller than the second reference value.

3. The printer according to claim 2,
wherein the print mode determination unit selects the partial serial print mode when a memory usage of the layout processing unit to perform the layout processing exceeds a prescribed space of an area on the memory, which is usable in the layout processing unit.

4. The printer according to claim 1,
wherein, during the partial serial print mode, an element that assigns a reference of document data included in a different page is provided,
output document data that cannot refer to document data of a reference destination is held in the memory until the corresponding output document data can refer to the document data of the reference destination, and
the layout processing unit layouts output document data other than the held output document data.

5. The printer according to claim 4, further comprising:
a display device that displays a user interface screen,
wherein, during the partial serial print mode, for the held output document data, a screen indicating that a print sequence was changed is displayed on the display device.

6. A print control method in a printer, which has a function to convert document data into print data and to execute printing, the print control method comprising:
receiving SVG (Scalable Vector Graphics) document data;
performing syntax/lexical analysis on the received SVG document data to generate output document data and stores the output document data in a memory;
performing a layout processing to process the output document data on the basis of prescribed style information;
converting the output document data subjected to the layout processing into print data and executing printing; and
selectively switching print modes,
the print modes have
processing a serial print mode, in which the output document data is generated in a page unit in the performing of the syntax/lexical analysis, the layout processing is performed in a page unit in the performing of the layout processing, and printing is executed in a page unit in the executing of printing,
processing a batch print mode, in which the output document data of all pages is generated in the performing of the syntax/lexical analysis, the layout processing is performed on all pages in the performing of the layout processing, and all pages are printed in the executing of printing, and
processing a partial serial print mode, in which the output document data is generated in a page unit in the performing of the syntax/lexical analysis, and when the amount of the generated output document data is equal to or more than a prescribed first reference value, the performing of the layout processing and the executing of printing are performed, and
in the selectively switching the print modes, a streamable attribute value included in the SVG document data is referred to, when the attribute value is true, the serial print mode is selected, when the attribute value is false, the batch print mode is selected, and when the batch print mode is selected, and the amount of the generated output document data is equal to or more than a prescribed second reference value, the partial serial print mode is selected.

* * * * *